Patented Aug. 11, 1953

2,648,679

UNITED STATES PATENT OFFICE 2,648,679

1-KETO-8RO-1,2,3,4,4a,5,6,10b,11,12,12a DODECAHYDROCHRYSENES

William S. Johnson, Madison, Wis., and Dilip K. Banerjee, Calcutta, India, assignors to Wisconsin Alumni Research Foundation, Madison, Wis., a corporation of Wisconsin No Drawing. Application August 8, 1950, Serial No. 178,357

7 Claims. (Cl. 260—340.5)

The present invention relates to chemical processes and resulting products, and more particularly to improved processes and novel intermediates having utility in the hormone field. The processes and products of the present invention, for example, may be used in the total synthesis of estrone. See Johnson, Banerjee, Schneider and Gutsche, J. Am. Chem. Soc. 72, 1426 (1950).

The processes of the present invention may be illustrated by the following formulas:

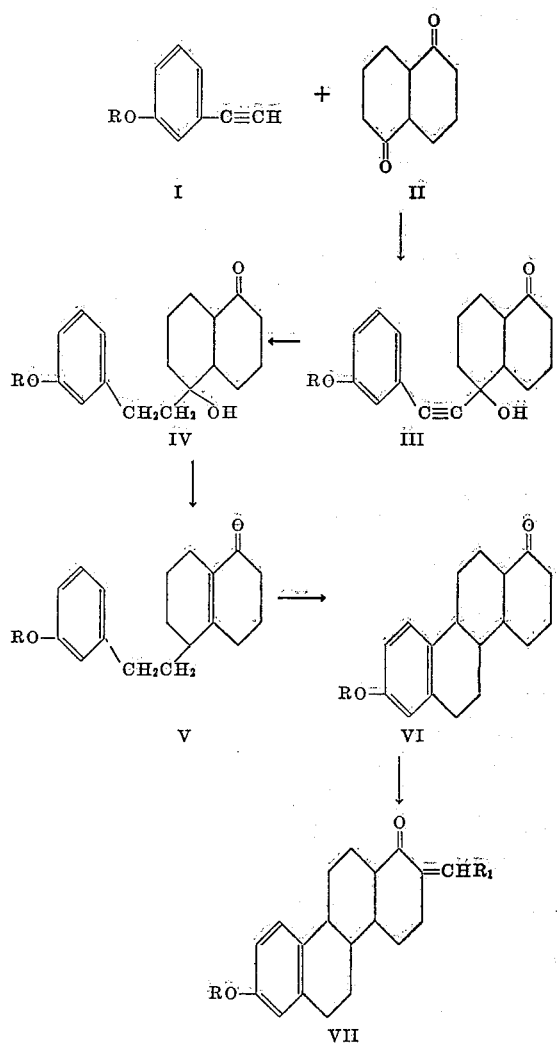

*m-Methoxyacetophenone.*—To a stirred solution of 102 g. of m-hydroxyacetophenone in 245 ml. of 15% potassium hydroxide at 55° C. was added 94.5 g. of dimethyl sulfate at such a rate that the temperature was maintained at 60–65° C. The reaction mixture was next treated with further quantities of 124 ml. of 15% potassium hydroxide and 47.5 g. of dimethyl sulfate with alternate additions of equivalent quantities of each of the reagents successively in six equal portions; the temperature being maintained at 60° C. throughout the addition. A solution of 76 g. of potassium hydroxide in 200 ml. of water was then added and the mixture was heated on a steam bath with stirring for one hour. The cooled reaction mixture was twice extracted with ether and the ethereal solution was washed with water and dried by passing through anhydrous sodium sulfate. Ether was removed and the residue distilled, B. P. 130–132° (16 mm.).

*m-Methoxyphenylacetylene (I).*—(a) A solution of 94 g. of m-methoxyacetophenone in 25 ml. of dry benzene was treated with 134 g. of phosphorus pentachloride in an ice and water bath with frequent swirling. The reaction mixture was allowed to stand at room temperature (21° C.) with occasional swirling for ten hours, when a dark green solution was obtained. It was then decomposed by slowly pouring into crushed ice and water and thorough shaking. The light yellow heavy oil was extracted with ether and was washed several times with water. On removal of the solvent the crude product was refluxed with 120 g. of potassium hydroxide and 150 ml. of 95% ethanol in an oil bath held at 110–114° C. for thirteen hours. Water was added to the reaction mixture and the separated oil was taken up in ether. The ethereal layer was washed with saturated sodium chloride solution. Ether was removed and the residue fractionated. A product boiling between 100–102° (14 mm.) was collected which showed positive Beilstein's test. This was then allowed to stand over solid potassium hydroxide for sixteen hours and refractionated through a ten inch Vigreux column over fresh pellets of potassium hydroxide and a fraction boiling between 94–100° C. (14 mm.) was collected. This product was negative to Beilstein's test.

(b) m-Methoxyacetophenone in 15 ml. of benzene was treated with 85 g. of phosphorus pentachloride in the same manner as described above in (a). On working up 64.5 g. of the crude product was refluxed with 35 g. of potassium hydroxide and 80 ml. of 95% ethanol on the steam bath. The reaction mixture was worked up as above and the product thus obtained was retreated with 40 g. of potassium hydroxide and 50 ml. of 95% ethanol in an oil bath held at 120–126° C. for twelve hours. Isolation and purification was carried out as described before and a product was obtained boiling at 105–115° (25 mm.), which on redistillation over solid potassium hydroxide through a Vigreux column yielded m-methoxyphenylacetylene, B. P. 94–100° (14 mm.), $n_D^{25}$ 1.5558.

For further purification 57 g. of the above product was distilled through a Fenske column at a reflux ratio of 1:10 and four different cuts were collected consisting of (1) 1 g., (2) 13.61 g., (3) 24.7 g. and (4) 10.15 g., B. P. 90–93° (12–16 mm.). The second, third and fourth fractions had the constant refractive index $n_D^{25}$ 1.5560. For the next step this purification, however, was found to be unnecessary.

*Condensation of m-methoxyphenylacetylene (I) with trans-decalin-1,5-dione (II).*—To a solution of 0.9 g. of potassium in 30 ml. of tert. butyl alcohol (dried over aluminum tert. butoxide) 3.4 g. of m-methoxyphenylacetylene was added slowly in the cold; 5 ml. of tert. butyl alcohol being used for washing. The clear lightly colored solution was transferred to a separatory funnel with the aid of 10 ml. of tert. butyl alcohol and this was then added, within a period of one and one-half hours, to a warm solution (heated to the boiling point) of 4.15 g. of trans-decalin-1,5-dione (M. P. 163–165° C.) in 50 ml. of tert. butyl alcohol with stirring and in an atmosphere of nitrogen. An orange color developed, which deepened on allowing the reaction mixture to stand for twelve hours. It was then stirred for a while with a solution of 5 g. of ammonium chloride in 50 ml. of water in the cold, extracted with ether and the organic layer was thoroughly washed with sodium chloride solution. Solvents were removed on a steam bath, finally under diminished pressure. The crude product on tituration with ether and petroleum ether (40–60°) gave a solid product melting at 68–76°. This product after three recrystallizations from ether-petroleum ether (40–60°) yielded (α)-5-hydroxy-5-β-(m-methoxyphenyl)-ethynyl-decalone-1 (III) as colorless plates, M. P. 83.8–84.8° C.

From the mother liquors of the α-isomer after concentration another product could be isolated, melting at 107–111° C., which after two recrystallizations from ether-petroleum ether (40–60°) yielded the β-isomer (III) as rectangular prisms, M. P. 116–116.6°.

Residues left from the mother liquors of the above two isomers were treated with ether in the cold, when a small quantity of a white insoluble product was isolated, M. P. 182–184°. On recrystallization from benzene-ether 1,5-dihydroxy-1,5-di-β-(m-methoxyphenyl)-ethynyl-decalin separated out in glistening white crystals, M. P. 188.4–189.4°.

After separation of the high melting dicondensation product from the rest of the material by repeated treatment with ether and filtration, a third isomer could be isolated melting at 92–100°, which on three recrystallizations from ether-petroleum ether (40–60°) was obtained as white crystalline powder, M. P. 99.4–100.2°. This isomer proved to be the polymorphic form of the α-isomer (M. P. 83.8–84.8°).

*Condensation of m-methoxyphenylacetylene with cis-decalin-1,5-dione.*—Condensation was carried out in the same manner as described above with the trans product using potassium m-methoxyphenyl acetylide prepared from 2.66 g. of m-methoxyphenylacetylene, 0.78 g. of potassium in 20 ml. of tert. butyl alcohol and 3.34 g. of cis-decalin-1,5-dione (M. P. 79–81°) in 20 ml. of tert. butyl alcohol; 25 ml. of tert. butyl alcohol being used for washing down the reactants. The product was worked up in the usual way and the main product, besides the isolation of the high melting dicondensation product, was found to be the isomer melting at 99–100°. Mixtures of the trans and cis-decalin-1,5-dione may also be employed satisfactorily in the described synthesis.

*5-hydroxy - 5 - β-(m - methoxyphenyl)-ethyldecalone-1, (IV).*—A solution of 0.2877 g. of (α)-5-hydroxy - 5 - β - (m - methoxyphenyl)ethynyldecalone-1 (M. P. 83.8–84.8°) in 20 ml. of ethyl acetate was stirred in an atmosphere of hydrogen with 0.1027 g. of 5% palladium charcoal (Mozingo B) catalyst, when 47.7 ml. of hydrogen was absorbed in nineteen minutes; theoretical requirement for one acetylenic bond being 48.4 ml. of hydrogen. The rate of absorption was uniform from beginning to end of the reduction experiment. The catalyst was filtered off after addition of a small quantity of ether, which seemed to help the coagulation of the finely suspended catalyst. Solvents were removed and the colorless gummy residue was allowed to stand at 35°. After twelve hours few crystals were formed. On tituration of the whole mass with ether-petroleum ether (40–60°) it completely solidified. The melting point of 76.8–77.6° was not changed by crystallization from ether-petroleum ether (40–60°).

The isomer with M. P. 99.4–100.2 also on hydrogenation yielded the same reduction product, checked by mixed melting point.

(β) 5 - hydroxy - 5 - β - (m-methoxyphenyl) - ethynyldecalone-1 (M. P. 116–116.6°) was reduced in the same way as described above and a product melting at 89–90.6° was isolated, which on recrystallization from ether-petroleum ether (40–60°) melted at 89.4–91°.

*5-β-(m-methoxyphenyl) ethyloctalone-1 (V).*—(a) Dehydration of (α) 5-hydroxy-5-β-(m-methoxyphenyl)ethyldecalone-1. The hydroxyketone (0.1758 g.) was heated under reflux at 120–130° in an oil bath for three and one-half hours with 5 ml. of 88% formic acid. Water was added after cooling and the separated gummy material was extracted with ether. The ethereal layer was washed with sodium bicarbonate solution until the aqueous wash was alkaline to litmus and then with water. On removal of the solvent 0.1642 g. of a viscous oil was obtained, which has so far resisted all attempts at inducing crystallization. The product was purified by evaporative distillation at bath temperature 200–215° (0.4 mm.).

(b) Reduction and dehydration of the gummy residue, left after separation of the crystalline material from the condensation product of m-methoxyphenylacetylene and decalin-1,5-dione, also yielded the same 5-β-(m-methoxyphenyl)ethyloctalone-1. 5.3 grams of such gummy product dissolved in 40 ml. of ethyl acetate was shaken with 1.8 g. of 5% Pd. charcoal (Mozingo B), when 98% of the theoretical amount of hydrogen was absorbed in three hours and twenty-eight minutes. The crude product was dehydrated without further purification by refluxing with 40 ml. of 88% formic acid for nine hours in an oil bath held at 130–136°. The product was worked up as described above and 5 - β - (m - methoxyphenyl)ethyloctalone - 1 (V), B. P. 210–214° (1 mm.) was obtained.

(c) For the preparation of the above unsaturated ketone (V) in comparatively large scale the following method was employed. The crude condensation product, obtained from 27.7 g. of m-methoxyphenylacetylene, 8.1 g. of potassium in 220 ml. of tert. butyl alcohol and 34.8 g. of decalin-1,5-dione in 150 ml. of tert. butyl alcohol, was boiled for ten minutes with 3 g. of Raney nickel catalyst in ethyl acetate solution and was filtered directly into a pressure bottle for hydrogenation; altogether 100 ml. of ethyl acetate being used. It was then shaken with 2 g. of Pd. charcoal catalyst (Mozingo B) in an atmosphere of hydrogen at 27 lbs. pressure. The approximately calculated amount of hydrogen was absorbed within thirteen and one-half hours. The product was worked up and isolated as previously described and was refluxed with 450 ml. of 88% formic acid for nineteen hours. On working up as described above 42 g. of 5-β-(m-methoxyphenyl)ethyloctalone-1 B. P. 202.5–206° (0.2 mm.) was obtained.

*1 - keto - 8 - methoxy - 1,2,3,4,4a,4b,5,6,10b,11, 12,12a-dodecahydrochrysene (VI).*—Dry hydrochloric acid gas was pased through a solution of 20.2 g. of 5-β-(m-methoxyphenyl)ethyloctalone-1 in 200 ml. of dry benzene cooled in ice water for one hour. 28 grams of anhydrous aluminum chloride was then added slowly to it with stirring. Stirring was continued at 28° C. for twenty hours and finally at 40–45° for seventy-two hours, at the end of which period a black heavy layer separated out at the bottom. The product was cooled, decomposed with ice and hydrochloric acid and extracted with ether. The ethereal layer was washed successively with strong hydrochloric acid, three times with water, dilute sodium hydroxide solution and with water. The residue left after evaporation of ether was purified by evaporative distillation under diminished pressure yielding a yellow glass, B. P. 220–240° (0.2–0.3 mm.).

The yellow glass obtained after evaporative distillation was dissolved in boiling 95% alcohol and allowed to stand in the cold, and a crystalline product melting at 140–156° with previous shrinking was obtained. After three crystallizations from the same solvent a product melting at 164–168° was obtained; and on further crystallization from absolute alcohol the α isomer separated as long needles, M. P. 168.4–170°.

On concentrating the mother liquors of the α-isomer another product melting at a range of 128–133° (shrinks at 127°) was obtained, which after three crystallizations from absolute alcohol yielded the β isomer as small needles, M. P. 153.4–154.8°. Mixed M. P. with the α isomer 134–150°.

*Piperonylidene derivative of the α isomer.*—A warm (heated to boiling point) solution of 1.03 g. of the α isomer (VI), 0.65 g. of piperonal in 55 ml. of absolute alcohol was treated with 6 ml. of potassium hydroxide solution (5 g. of potassium hydroxide in 10 ml. of water) in an Erlenmeyer flask, which was stoppered and kept at 42° C. for four days. The yellow crystals, which separated were filtered off, washed with alcohol and water, and dried, M. P. 179–184° (shrinks at 175°). On crystallization from acetone the pure piperonylidene derivative M. P. 190.2–192° (shrinks at 188°) was obtained.

*Piperonylidene derivative of β isomer (VII).*— Condensation was carried out in exactly the same manner as described above with 2.0 g. of the β isomer (VI), 1.1 g. of piperonal in 75 ml. of absolute alcohol and 12 ml. of potassium hydroxide solution (10 g. in 20 ml. water). The separated yellow crystals had a M. P. 199–206.4°, and on recrystallization from benzene melted at 206–210° (previous shrinking). The purest product after three crystallizations from benzene melted at 209–211.4° (shrinks at 207°).

In the formulas, R represents a blocking group such as lower alkyl, e. g., methyl, ethyl, etc.; aralkyl, e. g., benzyl; or aryl, e. g., phenyl. It replaces the hydrogen (H) of the hydroxyl group forming relatively stable methoxy, benzyloxy, phenoxy, etc., groups. Except for blocking (stabilizing) the oxy group during the reactions the R group is of little or no importance. When making a product such as estrone, for example, the R group is finally removed by hydrolysis to provide the desired free OH group. In the illustrative examples R is methyl, forming a methoxy group, but it will be understood that any of the equivalent blocking groups such as referred to above may be employed. The term "oxy" as used herein includes both the hydroxy and the hydrocarbon-oxy groups disclosed above. The R or hydrocarbon blocking group may contain 1 to 8 carbon atoms with the lower alkyl radicals which form lower alkoxy groups being generally preferred. The $R_1$ in Formula VII is also a blocking type group and represents an aryl group such as phenyl, naphthyl, etc. The complete group at the 2-position is an aryl methylene group. The exact position of the double bond in the octalone-1 group of Compound V is not known although investigations show it to be in the position indicated. In any event it is reduced when ring B is formed to make Compound VI.

We claim:

1. The products selected from the group consisting of 1-keto-8-RO-1,2,3,4,4a,4b,5,6,10b,11, 12,12a-dodecahydrochrysene and 2-arylmethylene derivatives thereof, where R is selected from the group consisting of hydrogen and hydrocarbon blocking groups containing 1 to 8 carbon atoms.

2. The 2-piperonylidene derivative of 1-keto-8 - R'O - 1,2,3,4,4a,4b,5,6,10b,11,12,12a-dodecahydrochrysene, where R' is a hydrocarbon blocking group containing 1 to 8 carbon atoms.

3. A product, 1-keto-8-R'O-1,2,3,4,4a,4b,5,6, 10b,11,12,12a-dodecahydrochrysene, where R' is a hydrocarbon blocking group containing 1 to 8 carbon atoms.

4. The product, (α) 1-keto-8-methoxy-1,2,3,4, 4a,4b,5,6,10b,11,12,12a-dodecahydrochrysene.

5. The product, (β) 1-keto-8-methoxy-1,2,3,4, 4a,4b,5,6,10b,11,12,12a-dodecahydrochrysene.

6. The process which comprises forming ring B by reacting 5-β-(m-R'O-phenyl)-ethyloctalone-1 with aluminum chloride in an anhydrous reaction mixture to form 1 - keto - 8 - R'O - 1,2, 3,4,4a,4b,5,6,10b,11,12,12a - dodecahydrochrysene, where R' is a hydrocarbon blocking group containing 1 to 8 carbon atoms.

7. The process which comprises forming ring B by reacting 5-β-(m-methoxyphenyl)-ethyloctalone-1 with aluminum chloride in an anhydrous reaction mixture to form 1-keto-8-methoxy-1,2, 3,4,4a,4b,5,6,10b,11,12,12a - dodecahydrochrysene.

WILLIAM S. JOHNSON.
DILIP K. BANERJEE.

No references cited.